United States Patent [19]

Eriksson et al.

[11] Patent Number: 5,400,324
[45] Date of Patent: Mar. 21, 1995

[54] METHOD TO PROVIDE LINK GROUPING IN A PACKET SWITCH

[75] Inventors: Tomas A. Eriksson, Stockholm; Rolf S. Sandin, Sollentuna; Hao Jiang, Bandhagen; Per A. M. Ljungberg, Stockholm, all of Sweden

[73] Assignee: Telefonaktiebolaget L M Ericsson, Stockholm, Sweden

[21] Appl. No.: 31,903

[22] Filed: Mar. 16, 1993

[30] Foreign Application Priority Data

Mar. 17, 1992 [SE] Sweden ................................. 9200813

[51] Int. Cl.$^6$ ............................................ H04L 12/56
[52] U.S. Cl. ........................................ 370/60; 370/61; 370/65.5; 370/94.1; 370/94.2
[58] Field of Search .................. 370/60, 61, 65.5, 94.1, 370/94.2

[56] References Cited

U.S. PATENT DOCUMENTS

| | | | |
|---|---|---|---|
| 4,870,641 | 9/1989 | Pattavina | 370/60 |
| 5,016,245 | 5/1991 | Lobjinski et al. | 370/60 |
| 5,124,978 | 6/1992 | Chao | 370/60 |

FOREIGN PATENT DOCUMENTS

| | | |
|---|---|---|
| 2006392 | 6/1990 | Canada . |
| 0159810 | 10/1985 | European Pat. Off. . |
| 0374574 | 6/1990 | European Pat. Off. . |
| WO85/04300 | 9/1985 | WIPO . |
| WO90/12467 | 10/1990 | WIPO . |

OTHER PUBLICATIONS

"Paralleling Links in a Unifed Switching Architecture for Circuit/Packet Switching", *IBM Technical Disclosure Bulletin*, vol. 32, pp. 45-49 (Feb. 1990).

T. Kozaki et al., "32×32 Shared Buffer Type ATM Switch VLSI's for B-ISDN's", *IEEE Journal on Selected Areas in Communications*, vol. 9, pp. 1239-1247 (Oct. 1991).

*Primary Examiner*—Douglas W. Olms
*Assistant Examiner*—Russell W. Blum
*Attorney, Agent, or Firm*—Burns, Doane, Swecker & Mathis

[57] ABSTRACT

In a packet switch, which is intended for packets of constant length, and which, between switch ports, is divided into a number of nodes (12) and transmission links (14), where the nodes carry out space selection and the transmission links offer point-to-point transmission between the nodes, link grouping is carded out. More particularly, from multiple parallel physical links coming in the switch, link groups are produced, each in the form of a logical link with a bandwidth that is the sum of the bandwidths of the physical links included in the link group, said logical link being restored to outgoing parallel physical links from the switch. One or more link protocols (G1,G2) are used according to which a label in the packet's header is made to describe a route that holds together the grouped links through the entire switch, such that bits in the label describing the route over a certain transmission link are the same for packets belonging to the same link group.

14 Claims, 2 Drawing Sheets

METHOD TO PROVIDE LINK GROUPING IN A PACKET SWITCH

TECHNICAL BACKGROUND

The present invention relates in general to link grouping in packet switches for packets with constant length, e.g., ATM switches (ATM=Asynchronous Transfer Mode). Link grouping means that a logical link is created consisting of many parallel physical links. The logical link offers a bandwidth that is the sum of that of the physical links. In this way, for example, a logical link with a bandwidth of 622.08 Mb/s can be provided through link grouping of four physical 155.52 Mb/s links.

More particularly the invention relates to a method for providing link grouping in a packet switch of the kind intended to be used for constant length packets and between switch ports being divided into a number of nodes and transmission links, where the nodes perform space selection and the transmission links offer point-to-point transmission between the nodes, said link grouping comprising creating, out of a number of parallel physical links coming into the switch, link groups, each in the form of a logical link with a bandwidth that is the sum of the bandwidths of the incoming physical links included in the link group, and restoring said logical link to outgoing parallel physical links from the switch.

In an ATM-switch for wideband telecommunication there is a need for higher bandwidth than that which is physically available. Link grouping can offer good traffic characteristics and hardware flexibility and effectivity, for example smaller delay, fewer buffers, and the realization of different types of concentrators/multiplexers and switches in different speed classes while using the same base components. Blocking characteristics in a link coupled network, for example a Clos-network, are also improved through logical speedup, achieved with the help of link grouping. Methods available thus far for offering a wideband link are:
1. high physical speed,
2. series-parallel conversion in order to attain higher logical speed than the physical one.

Disadvantages with the first method are the difficulty in realizing high speed electronics and mechanics, as well as the consequent power dissipation. The other method builds normally on multiplexing at bit-level and therefore requires bit-synchronous transmission.

Among publications discussing the need to create greater bandwidth than that which is physically available can be mentioned EP 0 374 574, WO 85/04300, WO 90/12467, and IBM Technical Disclosure Bulletin Vol 32, No. 9A, February 1990, pp. 45–49.

SUMMARY

One object with the present invention is to provide a method for doing link grouping of the type presented by way of introduction, which offers a simpler solution than previously known for the problem in the ATM context of achieving higher bandwidth than that which is physically available.

This object has been attained according to the invention by using one or more link protocols, according to which a label in the head of the the packets is made to describe a route that holds together the grouped links through the whole switch, and such that bits in the label describing the route over a certain transmission link are the same for packets belonging to the same link group.

DESCRIPTION OF DRAWINGS

The invention shall now be described in more detail with reference to the attached drawings, In which FIG. 1 schematically illustrates the general principle of link grouping to create logical links in an ATM switch.

PREFERRED EMBODIMENTS

The same reference numbers are used in the various Figures for the same or equivalent details.

Figure 1:
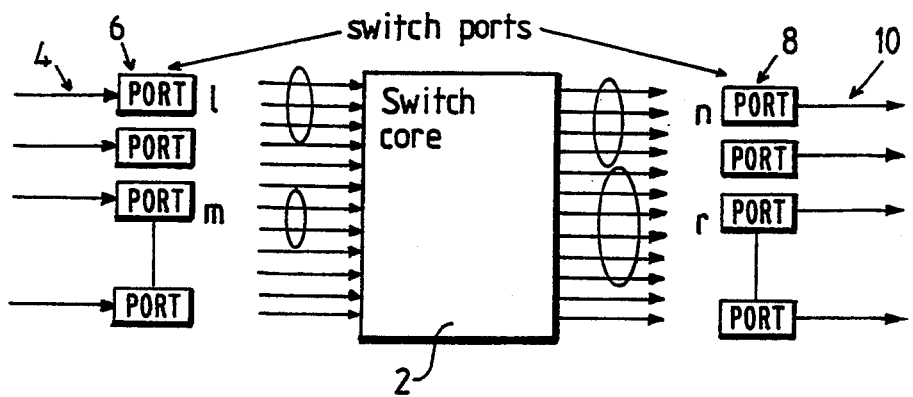

In FIG. 1, label 2 indicates a switch core in a packet switch for packets with constant length, e.g. an ATM switch. A number of parallel physical links 4 arrive at input switch ports 6 to the core 2. Before the core 2 occurs a link grouping of the physical links 4 for forming logical links, each consisting of several of the parallel links 4. This link grouping is indicated in FIG. 1, as in the following Figures, with ovals, for example, the ovals 1 and m in FIG. 1. The link grouping at the core's 2 outputs need not necessarily be the same as at the inputs, which is indicated in FIG. 1 where link groupings n and r at the outputs correspond to link groupings 1 and m, respectively, at the inputs.

Via output switch ports 8 a number of parallel, physical links 10 then leave the switch.

The link grouping is characterized more particularly in that the individual links in a group carry serial packet flows at the the interface of the switch core but constitute one logical link by use of protocols (supported by hardware) which are specific for a certain grouping definition. The link grouping should be as general as possible, that is, grouping in many different group sizes should be possible, as shown in FIG. 1. However, it is in practice most interesting to have the same link grouping at inputs and outputs, and to have groups which are multiples of four physical links. The link grouping can be described using a protocol stack of the type shown in FIG. 2. The upper part of this Figure indicates schematically how the switch core 2 can be divided into a number of nodes 12 and transmission links 14, where the nodes 12 perform space selection and the transmission links 14 offer point-to-point transmission between the nodes.

Figure 2:
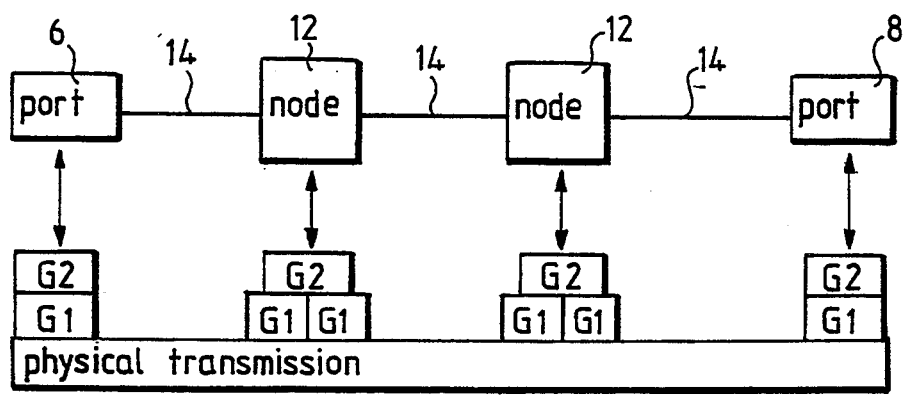
FIG. 2 shows a protocol model illustrating how to provide, according to the invention, link grouping in switches, FIG. 3 schematically illustrates multi-port link grouping according to the invention, FIG. 4 similarly schematically illustrates multi-port link grouping in a shared buffer pool FIG. 5 similarly schematically illustrates transmission of an internal flow of packets in one block to another block via grouped links.

Between the switch ports 6 and the nodes 12 the link grouping is defined by a protocol on level 2, G2, and over the transmission links a protocol on level 1, G1, is used. The association between elements in the upper and lower parts of FIG. 2 is indicated by double arrows.

That which is common for all thinkable variations of link grouping according to the invention is that the label number in the head of the packets describes a route that holds together the grouped links through the entire switch, which means that the bits in the label which describe the route over a certain transmission link are the same for packets which belong to the same group. This information is a part of G2.

Depending on how the rest of the protocol looks in level 2 (G2), link grouping can be divided into two types, namely multiport and interport link grouping.

Multiport link grouping shall be discussed first here with reference to FIGS. 3 to 6.

The advantage to this type of link grouping is that no extra functions are required in the switch ports, and its mechanism can more particularly be divided into what happens partly in the nodes and partly over the transmission links.

Figure 3:
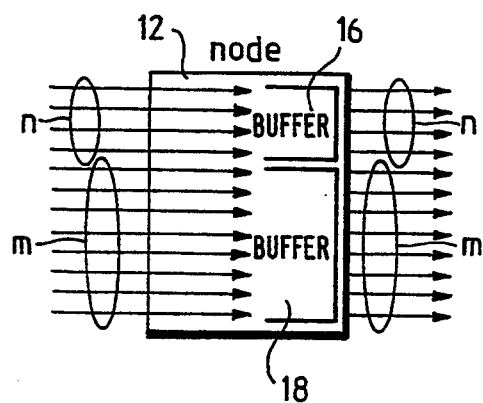

In a node the group is held together by using similar space selection for the grouped links, for example with the help of certain bits in the label number being identical, so that they come out on the same grouped output and the sequence is retained. This can be realized, for example, according to what is shown in FIG. 3, by links belonging to the same group, or logical links, for example n or m, being written into the same buffer 16 and 18, respectively, in the node 12, and being read out from the node serially on out-going links.

Figure 4:
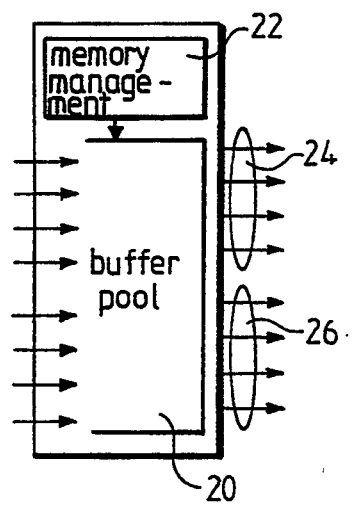

The common buffer principle, indicated with 20 in FIG. 4, can otherwise also be used, wherein link grouping and readout can be controlled by a function 22 for memory handling according to known principles, see for example IEEE JOURNAL ON SELECTED AREAS IN COMMUNICATIONS, October 1991, volume 9, number 8, p. 1239, "32*32 Shared Buffer Type ATM Switch VLSI's for B-ISDN's" which is incorporated here by reference. In FIG. 4 out-going logical links have been labeled with 24 and 26.

The functionality which must be introduced over a link is some type of simple link protocol (G1) in order to send and re-create a packet flow over a "parallel connection" with a division on the packet level according to the description below.

Figure 5:
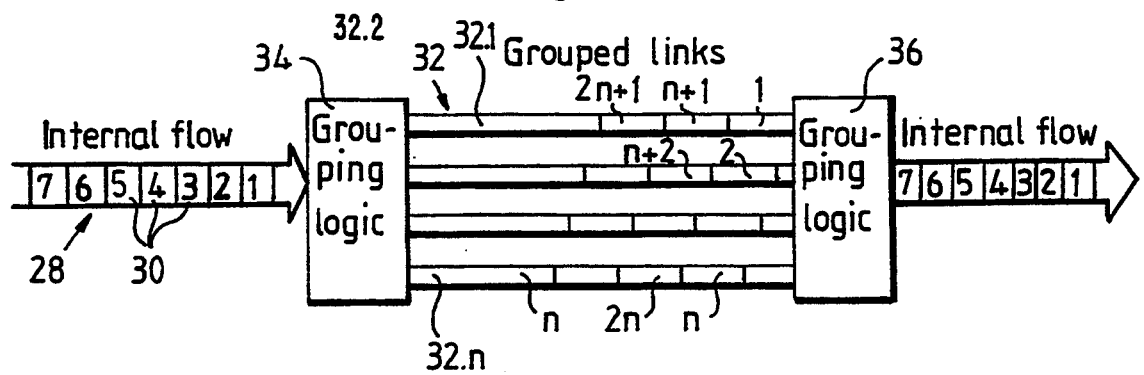

With reference to FIG. 5, a flow 28 of packets 30 with constant length internally in a block can be transmitted to another block via external links 32. The internal flow can be said to have a packet frequency of F packets/s. It follows that the time for a packet in the internal flow can be said to be $t = 1/F$.

The external links 32 can because of technical limits have a transmission capacity which is limited such that an external link can not handle a packet frequency of F, but only lower packet frequencies. In such a case can several external links 32 together, through grouping, transmit the internal packet flow 28.

When n external links 32.1, 32.2, ... 32.n are grouped and the packets 30 in the internal flow 28 are divided among them the packet frequency on every external link becomes F/n. It follows that the time for every packet on the external links becomes nt.

The sequence order between the packets is important and must be preserved. It is therefore important that the packets 30 are transmitted on the grouped links 32 in such a way that the sequence ordering can be preserved. In order for this to be possible grouping logic 34 is needed on the sending side, and restoration or recreating logic 36 on the receiving side.

The send and receive logic, 34 and 36 respectively, should be designed so that a certain spread in transmission time is allowed between the external links 32. The link protocol includes firstly a process for how the packets shall be portioned out and gathered in between the physical links, such that space correctness is preserved, for example in the sequence 1, 2, 3, 4.

Secondly, the protocol includes synchronization which secures that the packets are transmitted such that there exists a determined time pattern between the physical links. For example the packets can be sent out simultaneously or time delayed by a constant interval. The time delay/difference in length on the links, can be allowed to correspond to one packet if suitable bit and packet synchronization is introduced.

First a short description shall be given here of a suitable design for the sending and receiving logic.

The design should be done so that the packets 30 in the internal flow 28 are divided over the external links 32 according to a given pattern. One suitable pattern is a cyclical one according to the following: Packet 1 is sent on external link 32.1, packet 2 on link 32.2, etc., until packet n on link 32.n; thereafter packet n+1 on link 32.1, etc., according to FIG. 5. The packets on the external links should be sent with a mutual time delay such that if a packet (the first of the packets) is sent at time 0, packet 2 is sent at time t, etc., until packet n is sent at time $(n-1)t$, and thereafter packet n+1 at time nt.

Figure 6:
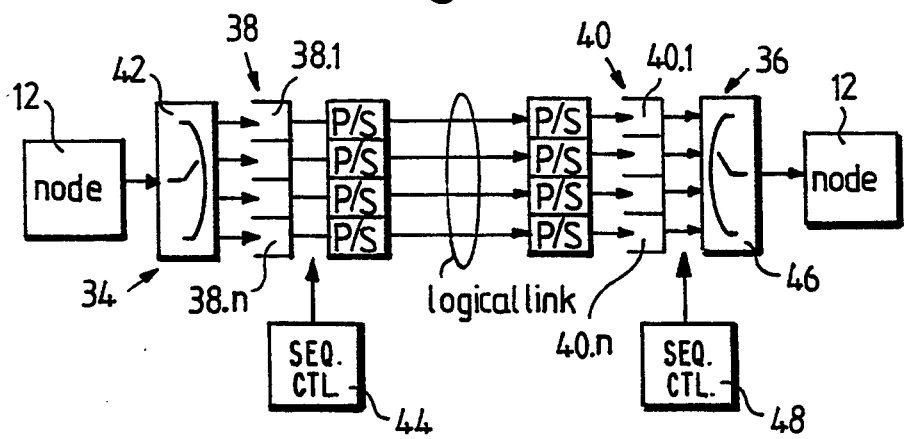
FIG. 6 shows a logical structure for link grouping over a link between nodes, FIG. 7 schematically illustrates label attachment in switch ports for interport link grouping according to the invention.

Since the division is done at packet level, two buffer stages, 38 and 40, must be introduced according to FIG. 6 because the bandwidth in to and out of the send queue is higher than the bandwidth of the physical links. The buffer stages compensate for the difference in bandwidth.

The grouping logic is built consisting of a distributing unit 42, one of the buffers 38.1 to 38.n per external link in the buffer stage 38, and a sequence control unit 44 that controls the time ordering between the packets on the external links. The distributing unit 42 allocates the packets, packet for packet, to the buffers 38.1 to 38.n toward the external links such that the distribution of packets between the links is obtained as described above.

The buffers 38.1 to 38.n, one to every external link, handle the differences in time between transmission of a packet on the internal flow verses on the external links. A buffer is filled with a packet from the internal flow in the time t. In the next time period of nt it is emptied toward the external link. To secure that the packet sequence is maintained and no packets pass by each other in the buffers, every buffer should have room for more than $1 - 1/n$ packets and less than $2 - 1/n$ packets.

The unit 44 for controlling the time ordering sees to it that the above indicated time ordering is maintained. The unit uses the packet flow on external link 32.1 as reference and controls the flows out of the buffers 32.2 to 32.n toward the other links based on this reference. Since the packet frequency is the same for all the external links the unit only needs to be activated upon initial startup or when some external link is restarted.

The restoration logic 36 consists of one of the buffers 40.1 to 40.n per external link, a gathering unit 46, and a sequence restoration unit 48.

Differences in transmission times between the different external links can arise. These differences can arise in the grouping logic 34, in the transport over the external links, as well as in the restoration logic 36. The restoration logic must therefore be built such that it can handle a spread in arrival time for the packets on the external links.

External link 32.1 maybe used as the reference. On the other external links the nominal arrival times for the packets are calculated starting from the reference. From the nominal arrival time a spread of +d is allowed. Normally d can be allowed to be d=nt/2, i.e., a half packet time on the grouped links.

The buffers 40 to the external links 32 are used to handle the differences in packet time between the external links and the internal flow. A buffer is filled with a packet from the external link during the time nt. The buffer is emptied thereafter toward the internal flow in the time t. In the buffers 40 the packet is also stored for an extra time of nominally d and maximum 2d to handle differences in actual verses nominal arrival time for packets on different links. The buffer needs to be maximum 2 packets long.

The gathering unit 46 picks up packets from the buffers 40 to the external links according to the order that is described above.

The sequence restoring unit 48 sees to it that packets are picked up in the order that is described above.

With interport link grouping the protocols act only between the switch ports. Two methods are conceivable here.

Figure 7:
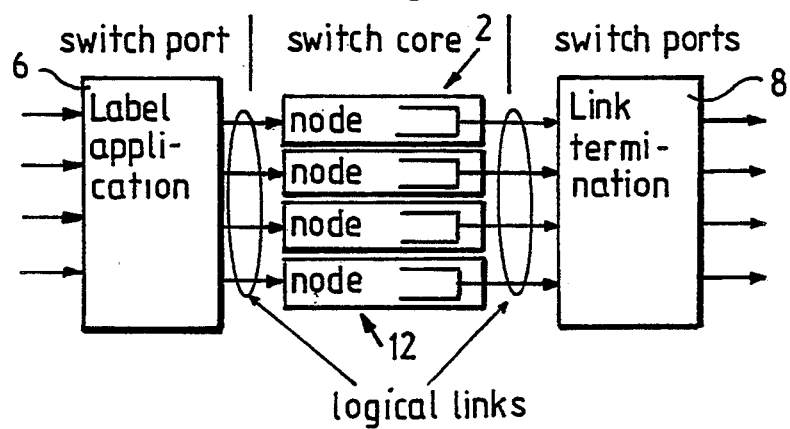

The first method is label based. With reference to FIG. 7, a label, based on VCI/VPI (Virtual Circuit Identifier/Virtual Path Identifier) information, is attached in the switch ports 6 to arriving packets in sequence for the grouped links. The switch core does not need to "know" anything about which physical links belong together. Only level 2 protocol is needed. The packets are supplied suitably with sequence numbers to be able to restore the sequence order if packets within the same group are delayed by different amounts of time along different physical routes.

With the above mentioned label attachment in the switch ports 6 a buffer is used that has a number of outputs corresponding to the number of links to be grouped. The links are written into the buffer and are read out sequentially on the outputs. The read-out routine is preferably arranged so that the incoming packets are distributed evenly over all the links in the group. The grouped packets also receive a label code that essentially contains the same bits. The grouping means must be able to buffer enough packets to be able, with help of the labels, to choose packets that shall go out on the same logical link, correct the sequence, and evenly distribute them on all the links in the group. Odd numbers of packets are filled out with empty packets. The link terminator 8 also contains a buffer large enough to enable correction of the sequence.

The other method is based on packet synchronism through the switch core. Protocols on both level 1 and level 2 are used.

The protocol on level 2 is based on a label attacher and a link terminator as in method one. The difference is that no sequence number is needed to secure the sequence, nor is any large buffer needed. On level 1 packet synchronism is secured in and between the switch ports and the nodes, so that the packets in the group move through the entire switch packet-synchronously. Sorting in the switch ports is carried through with help of the bits in the label that are different between packets within the group.

We claim:

1. A method of grouping links in a packet switch for constant-length packets, the packet switch having a plurality of nodes and a plurality of transmission links for selectively connecting a plurality of input ports to a plurality of output ports via routes through the switch, wherein the nodes enable space selection and the transmission links interconnect the nodes, comprising the steps of:

grouping, according to a link protocol, a plurality of incoming physical links into a link group, wherein the incoming physical links are connected to respective input ports, the link group has a bandwidth that is a sum of bandwidths of the grouped incoming physical links, and the link protocol requires labels in packets communicated via the link group, the labels describing a route through the switch that holds together the grouped incoming physical links and each label comprising at least one bit that describes the route and is identical to corresponding bits in labels of other packets communicated via the link group; and distributing packets communicated via the grouped incoming physical links among a plurality of outgoing physical links connected to output ports of the switch, wherein a sequence order of said packets is preserved;

wherein the link protocol provides for properly sequencing packets communicated via the link group .and synchronizing such packets based on a predetermined timing pattern.

2. The method of claim 1, wherein the link group is held together by space selection in the nodes based on the labels such that a sequence of the grouped incoming physical links are connected to a corresponding sequence of outgoing physical links.

3. The method of claim 2, wherein each node includes a plurality of buffer memories, the grouping step includes the step of storing packets communicated via the link group in the same buffer memory in each node, and the distributing step includes the steps of retrieving the stored packets from the buffer memories and providing the retrieved packets to the outgoing physical links.

4. The method of claim 2, wherein each node includes a buffer memory, the grouping step includes the step of storing packets communicated via a plurality of link groups in the buffer memory in each node, and the distributing step includes the steps of retrieving the stored packets from the buffer memories and providing the retrieved packets to respective groups of outgoing physical links.

5. The method of claim 1, wherein the link protocol provides for one of simultaneously transmitting the packets communicated via the link group or transmitting the packets communicated via the link group with a predetermined time delay between such packets.

6. The method of claim 1, wherein the link protocol acts on packets only between the input ports and output ports, providing for interport link grouping.

7. The method of claim 6, further comprising the steps of sequentially adding labels to packets arriving at the switch via the link group and sorting such packets based on the labels so that an arrival sequence of such packets is preserved.

8. The method of claim 6, wherein the switch includes a buffer memory having a plurality of outputs corresponding to the plurality of incoming physical links in the link group, the grouping step includes the step of storing packets communicated via the link group in the buffer memory, and the distributing step includes the steps of sequentially retrieving the stored packets from the buffer memory and providing the retrieved packets to the buffer's outputs.

9. The method of claim 8, wherein the retrieved packets are distributed evenly to the buffer's outputs.

10. The method of claim 9, further comprising the step of:
providing a predetermined set of bits in the labels in packets communicated via the link group.

11. The method of claim 10, wherein a plurality of packets are stored in the buffer memory, the distributing step includes the steps of selecting packets to be retrieved for an outgoing link group comprising a plurality of outgoing physical. links, and the retrieved packets are distributed evenly to the plurality of outgoing physical links.

12. The method of claim 11, wherein the distributing step includes the step of padding a plurality of packets comprising an odd number of packets with a predetermined number of empty packets.

13. A method of grouping links in a packet switch for constant-length packets, the packet switch having a plurality of transmission links for selectively connecting a plurality of input ports to a plurality of output ports via routes through the switch, comprising the steps of:
grouping, according to a link protocol, a plurality of incoming physical links into a link group, wherein the link group has a bandwidth that is a sum of bandwidths of the grouped incoming physical links;
connecting incoming physical links to respective input ports;
providing, according to the link protocol, labels for each packet communicated via the link group, wherein the labels describe a route through the switch;
distributing packets communicated via the grouped incoming physical links among a plurality of outgoing physical links connected to output ports of the switch; and
preserving a sequence order of said packets as they are being communicated synchronizing packets communicated via the link group based on a predetermined timing pattern established by said link protocol.

14. A method for routing packets in a packet switched network comprising the steps of:
transmitting an internal flow of packets in a sequence to a grouping logic device;
distributing said packets using a link protocol over a plurality of physical links according to a predetermined timing pattern established by said link protocol;
receiving said packets at a recreating logic device using said predetermined timing pattern; and
outputting said packets from said recreating logic in said sequence.

* * * * *